United States Patent
Ye

(10) Patent No.: US 8,292,377 B2
(45) Date of Patent: Oct. 23, 2012

(54) COMPUTER

(75) Inventor: Zhen-Xing Ye, Shenzhen (CN)

(73) Assignees: Hong Fu Jin Precision Industry (ShenZhen) Co., Ltd., Shenzhen, Guangdong (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 170 days.

(21) Appl. No.: 12/875,090

(22) Filed: Sep. 2, 2010

(65) Prior Publication Data

US 2012/0001528 A1   Jan. 5, 2012

(30) Foreign Application Priority Data

Jun. 30, 2010  (CN) .......................... 2010 1 0214317

(51) Int. Cl.
*H05K 7/00* (2006.01)
(52) U.S. Cl. ................................ 312/223.2
(58) Field of Classification Search ............... 211/90.01, 211/90.02, 96, 150, 169; 248/240, 240.3, 248/236, 238; 108/99, 93, 134, 135, 50.11, 108/50.02, 33; 312/223.2, 223.1, 295, 298, 312/300, 310, 313, 315, 321.5, 326, 329, 312/237, 248, 280, 281
See application file for complete search history.

(56) References Cited

U.S. PATENT DOCUMENTS

| | | | | |
|---|---|---|---|---|
| 363,372 | A * | 5/1887 | Dollens ........................ | 312/291 |
| 2,908,397 | A * | 10/1959 | Patterson ...................... | 108/179 |
| 4,960,257 | A * | 10/1990 | Waters ........................ | 248/442.2 |
| 5,262,762 | A * | 11/1993 | Westover et al. ............. | 345/168 |
| 5,383,642 | A * | 1/1995 | Strassberg ................... | 248/442.2 |
| 5,408,936 | A * | 4/1995 | Tseng ............................. | 108/42 |
| 6,086,033 | A * | 7/2000 | Calleja ......................... | 248/240 |
| 6,152,311 | A * | 11/2000 | German ....................... | 211/86.01 |
| 6,202,874 | B1 * | 3/2001 | Diamond ..................... | 220/4.03 |
| 6,290,200 | B1 * | 9/2001 | Ko .............................. | 248/442.2 |
| 6,471,170 | B2 * | 10/2002 | Pook ............................. | 248/215 |
| 7,681,856 | B1 * | 3/2010 | Thomas et al. ............. | 248/442.2 |
| 8,066,340 | B2 * | 11/2011 | Bielecki ........................ | 312/259 |
| 2005/0173359 | A1 * | 8/2005 | Wagner et al. ............. | 211/90.02 |
| 2007/0086154 | A1 * | 4/2007 | Koch ............................ | 361/681 |
| 2007/0159035 | A1 * | 7/2007 | Mullen ........................ | 312/245 |
| 2008/0123284 | A1 * | 5/2008 | Jaramillo et al. ............. | 361/686 |

FOREIGN PATENT DOCUMENTS

| EP | 0569316 | * | 4/1993 |
|---|---|---|---|
| FR | 2792422 | * | 10/2000 |

OTHER PUBLICATIONS

Chinese abstract and figure for application 101145070 inventor Pei H published Mar. 19, 2008.*

* cited by examiner

*Primary Examiner* — Janet M Wilkens
(74) *Attorney, Agent, or Firm* — Altis Law Group, Inc.

(57) ABSTRACT

A computer includes a chassis and a stowage structure. The stowage structure includes a connecting member mounted to a side plate of the chassis, a cover plate rotatably mounted to the connecting member, and a first supporting plate rotatably mounted to the cover plate to accommodate a first peripheral device between the cover plate and the first supporting plate.

5 Claims, 4 Drawing Sheets

COMPUTER

BACKGROUND

1. Technical Field

The present disclosure relates to computers and, particularly, to a computer providing stowage structure.

2. Description of Related Art

As is well known, personal computers are provided in a wide variety of physical shapes and configurations such as a desktop computer which may include separate main box, monitor, keyboard and mouse, together with other separate computing accessories. When the desktop computer is to be relocated, the separate computer, monitor, keyboard and mouse require considerable handling. Further, when the desktop computer is not in use, considerable space is still occupied.

Therefore, a computer with novel configurations is desired to overcome the limitations described.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
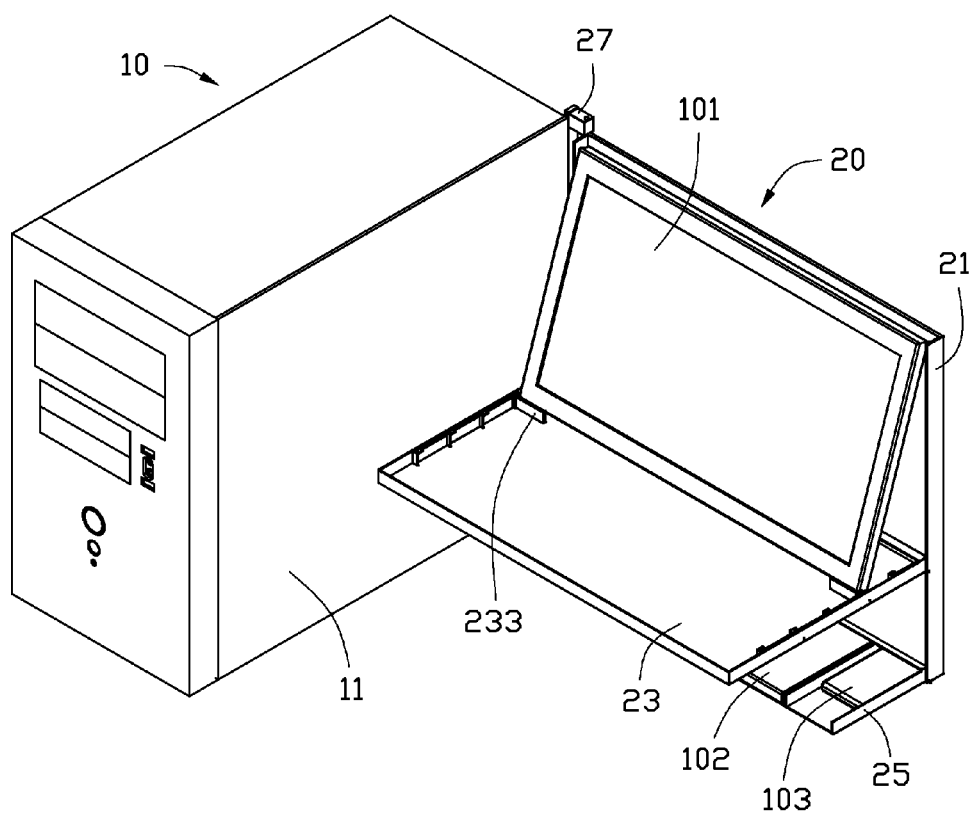
FIG. 1 and FIG. 2 are assembled, isometric views of a computer according to an exemplary embodiment, showing different use states.
Figure 2:
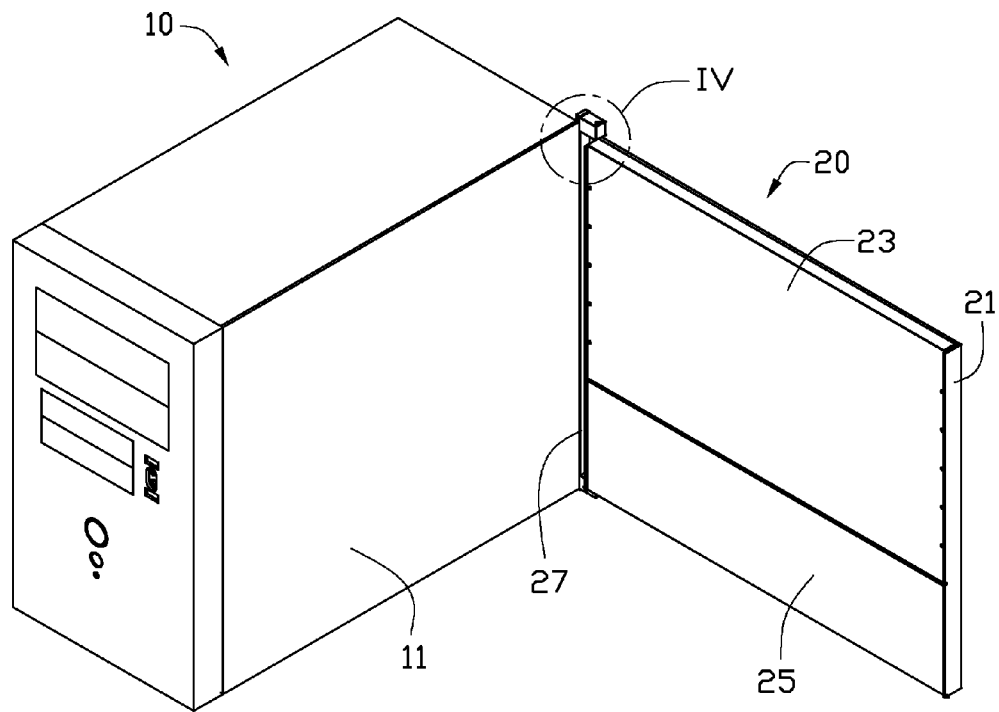

Referring to FIGS. 1-2, a computer, according to an exemplary embodiment, is shown. The computer includes a chassis 10 and a stowage structure 20 for accommodating a first peripheral device 101, a second peripheral device 102, and a third peripheral device 103. In the illustrated embodiment, the first peripheral device 101 is shown as a flat panel display device, the second peripheral device 102 is shown as a keyboard, and the third peripheral device 103 is shown as a mouse.

Figure 3:
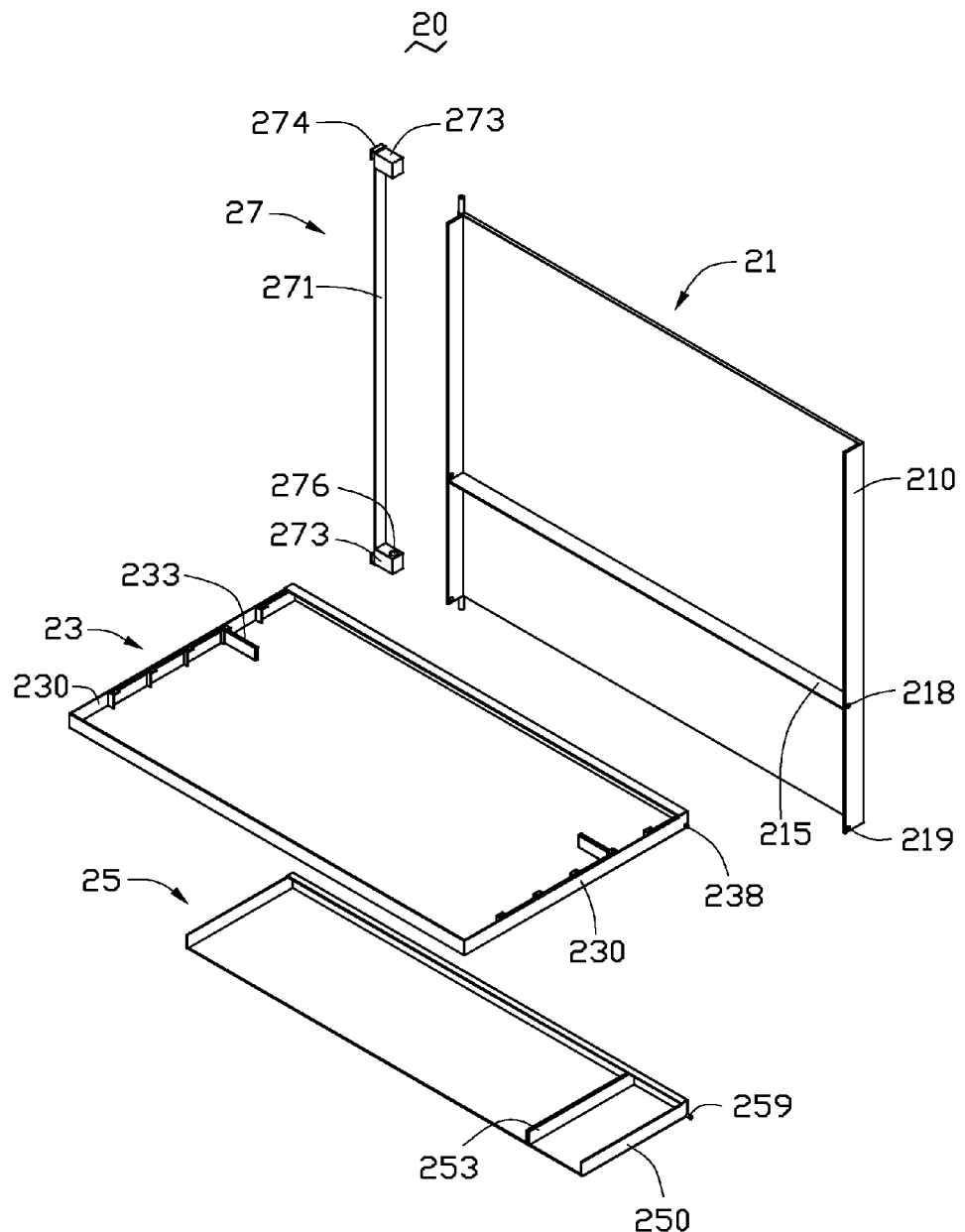
FIG. 3 is an exploded, isometric view of a stowage structure of the computer of FIG. 1.

Referring to FIG. 3, the stowage structure 20 includes a cover plate 21, a first supporting plate 23, a second supporting plate 25, and a connecting member 27. The cover plate 21 includes two rims 210 on a right side and a left side thereof respectively. A partition bar 215 is transversely defined on a middle of the cover plate 21. Each of the two rims 210 defines a first pin hole 218 adjacent the partition bar 215 and a second pin hole 219 adjacent a bottom of each of the two rims. Two third pins 213 extend from two ends of the left side rim.

The first supporting plate 23 includes two rims 230 in a right side and a left side thereof respectively. A plurality of positioning blocks 233 is symmetrically and pivotably mounted to two inner sides of the two rims 230. Two first pins 238 extend from two rear ends of the two rims 230.

The second supporting plate 25 includes two rims 250 on a right side and a left side thereof respectively. A partition bar 253 is longitudinally defined on the second supporting plate 25 and positioned close to the right side of the second supporting plate 25. Two second pins 259 extend from two rear ends of the two rims 250.

The connecting member 27 includes a post 271 and two connecting portions 273 defined on two ends of the post 271. One end of each of the two connecting portions 273 includes a hook 274, and the other end of each of the two connecting portions 273 defines a third pin hole 276 parallel to the post 271.

Figure 4:
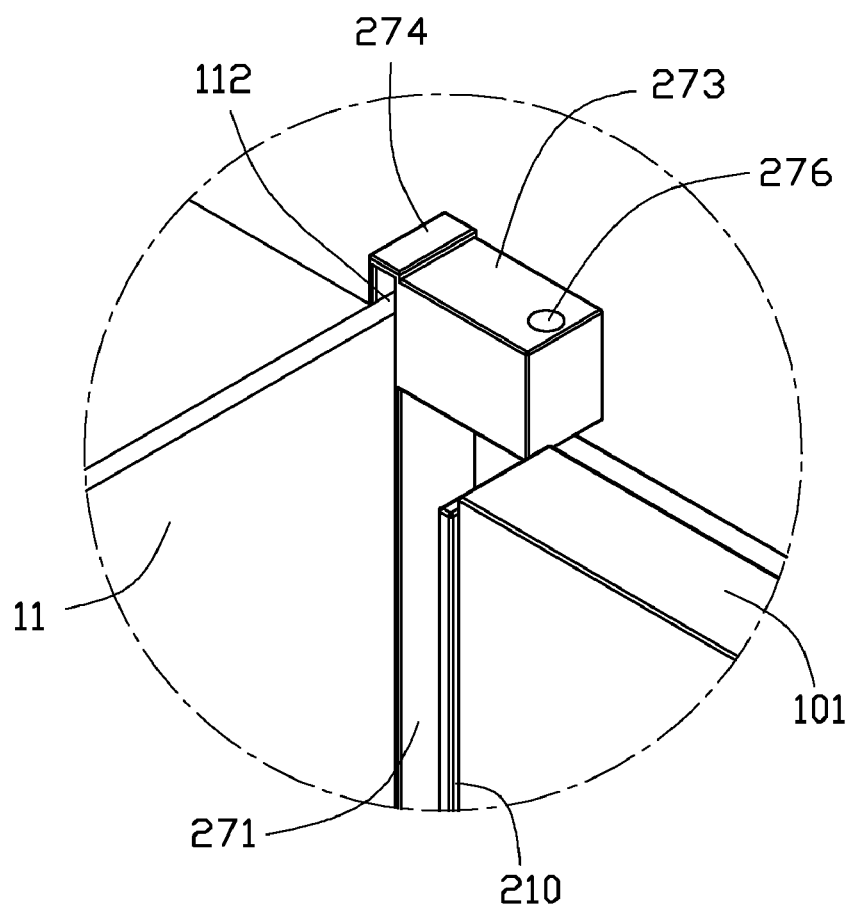
FIG. 4 is an enlarged view of encircled portion IV of FIG. 2.

Referring to FIG. 4, a mounting portion 112 extends outward from a rear end of a side plate 11 of the chassis 10.

During assembly of the first supporting plate 23 to the cover plate 21, the first supporting plate 23 is rotatably received in the cover plate 21 and positioned above the partition bar 215 by each of the two first pins 238 of the first supporting plate 23 passing through the first pin hole 218 of the cover plate 21. During assembly of the second supporting plate 25 to the cover plate 21, the second supporting plate 25 is rotatably received in the cover plate 21 and positioned below the partition bar 215 by each of the two second pins 259 of the second supporting plate 25 passing through the second pin hole 219 of the cover plate 21. During assembly of the cover plate 21 to the connecting member 27, the cover plate 21 is rotatably received in the connecting member 27 by each of the two third pins 213 of the cover plate 21 passing through the third pin hole 276 of each of the two connecting portions 273. During assembly of the stowage structure 20 to the chassis 10, the stowage structure 20 is rotatably received in the chassis 10 by the hook 274 of the connecting member 27 mounted to mounting portion 112 of the side plate 11 of the chassis 10.

When the computer is not in use or is to be relocated, the first peripheral device 101 is received on the first supporting plate 23, the second peripheral device 102 is received on a left side of the partition bar 253 of the second supporting plate 25, and the third peripheral device 103 is received on a right side of the partition bar 253 of the second supporting plate 25. The first supporting plate 23 and the second supporting plate 25 abut the cover plate 21 respectively by upward rotation of the first supporting plate 23 and the second supporting plate 25. The first supporting plate 23 and the second supporting plate 25 retain on the cover plate 21 respectively by latches (not shown). The latches, well known in the fields related to the invention, are not described in detail here. Accordingly, the first peripheral device 101 is accommodated between the cover plate 21 and the first supporting plate 23. The second peripheral device 102 and the third peripheral device 103 are accommodated between the cover plate 21 and the second supporting plate 25.

Referring to FIG. 1, when the computer is in use, the first peripheral device 101 can be received at an angle on the first supporting plate 23, an upper portion of the first peripheral device 101 abuts the cover plate 21, and one of each pairs of the plurality of positioning blocks 233 abuts a lower portion of the first peripheral device 101. Accordingly, the first peripheral device 101 and the first supporting plate 23 can be mounted to each other.

While the invention has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer comprising:
a chassis; and
a stowage structure comprising a connecting member mounted to a side plate of the chassis, a cover plate rotatably mounted to the connecting member, and a first supporting plate rotatably mounted to the cover plate; wherein the connecting member comprises a post and two connecting portions defined on two ends of the post, wherein one end of each of the two connecting portions comprises a hook and the other end of each of the two connecting portions defines a pin hole; wherein the cover plate comprises two rims in a right side and a left side thereof respectively and two pins extend from two ends of the left side rim; wherein the cover plate is rotatably mounted to the connecting member by each of the two pins of the cover plate passing through the pin hole of each of the two connecting portions.

2. The computer of claim 1, wherein the chassis comprises a mounting portion extending from a rear end of the side plate of the chassis, and wherein the connecting member mounted to the chassis by the hook of the connecting member is mounted to mounting portion of the side plate of the chassis.

3. The computer of claim 1, wherein the stowage structure further comprises a second supporting plate rotatably mounted to the cover plate.

4. A computer comprising:
a chassis; and
a stowage structure comprising a connecting member mounted to a side plate of the chassis, a cover plate rotatably mounted to the connecting member, a first supporting plate rotatably mounted to the cover plate, and a second supporting plate rotatably mounted to the cover plate; wherein the first supporting plate comprises two rims in a right side and a left side thereof respectively, and a plurality of positioning blocks symmetrically placed and pivotably mounted to two inner sides of the two rims; when a first peripheral device is received at an angle on the first supporting plate, an upper portion of the first peripheral device abuts the cover plate, and one of each pairs of the plurality of positioning blocks abuts a lower portion of the first peripheral device.

5. The computer of claim 4, wherein the cover plate comprises a partition bar transversely defined on a middle thereof, and wherein the first supporting plate is positioned above the partition bar, wherein the second supporting plate is positioned below the partition bar.

* * * * *